Aug. 25, 1942. P. H. GENTZEL Re. 22,164

VALVE MECHANISM

Original Filed Jan. 30, 1935

INVENTOR

Perry H. Gentzel by Jas. H. Churchill

Atty.

Reissued Aug. 25, 1942

Re. 22,164

UNITED STATES PATENT OFFICE 22,164

VALVE MECHANISM

Perry H. Gentzel, State College, Pa.

Original No. 2,145,870, dated February 7, 1939, Serial No. 4,114, January 30, 1935. Application for reissue July 24, 1940, Serial No. 347,308

6 Claims. (Cl. 137—53)

Figure 1:
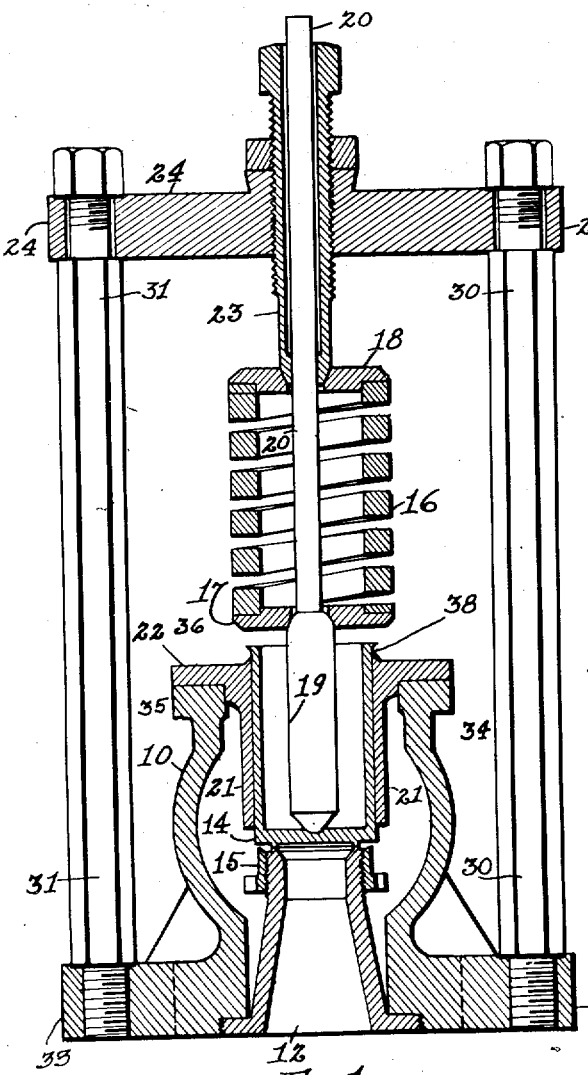

This invention relates to valve mechanisms for controlling the flow of heated fluids, and more particularly highly heated fluids, such as superheated steam, gas, oil, or the like, and especially fluids whose temperature may be as high as or above 1000° F.

The invention has for its object to provide a valve mechanism in which the valve rod or other mechanism for operating the valve controlling the flow of the highly heated fluid through the valve casing, is safeguarded against the action of the highly heated fluid flowing through the valve casing when the valve is initially opened. On the initial opening of the valve the hot fluid flows through the valve casing and comes in contact with a portion of the valve casing with which it does not contact when the valve is initially closed, and as a result this portion of the valve becomes heated by the hot fluid and is elongated thereby on the initial opening of the valve. The valve is closed by an operating mechanism which in valve mechanisms now commonly constructed and known to me, is carried by a bonnet or other member which is connected with the portion of the valve casing which is elongated by the hot fluid when the valve is initially opened. As a result of the elongation referred to, the relation of the valve operating mechanism and the valve to its seat, is disturbed on the initial opening of the valve. This disturbance may vary from 0.020 to 0.050 of an inch, and this variation creates an error in the subsequent operation of the valve, which is especially true of the so-called pop valves in which a helical spring forms part of the valve-operating mechanism, and is initially adjusted to seat the valve by a hollow rod in threaded engagement with the bonnet of the valve casing.

In pop valves of the ordinary construction referred to, the helical spring is compressed by the hollow rod to initially hold the valve to its seat, until the pressure of the hot fluid has reached a point at which it is desired the valve should open or pop. On the initial pop, the hot fluid causes elongation of the helical spring and thereby weakens the same, so that when the valve is again closed, the pressure required to open or pop the valve a second time will be lower than the pressure required to initially open or pop the valve. As a result the valve after its initial pop will be opened on the second and subsequent pops at a lower pressure than that at which it is set to operate on the initial pop. This variation in pressure may run from 8 to 75 pounds gage.

In accordance with the present invention, the variation in the condition of the valve operating mechanism on the intial opening of the valve, is avoided or at least reduced to a minimum on the second and subsequent openings of the valve.

To this end provision is made for supporting the valve operating mechanism at a relatively remote position from the valve itself and for connecting said supporting mechanism with a portion of the valve casing which is not materially lengthened by the hot fluid on the initial opening of the valve.

In the preferred embodiment of the invention, the supporting mechanism referred to consists of a cross member and rods or bars, preferably of Invar metal, which are connected at one end with the said cross member and at their opposite ends with lateral extensions or arms on the valve casing, preferably located at or near the bottom or inlet end of said valve casing. The lateral extensions or arms referred to are made of sufficient length to enable the rods connected therewith to be removed a substantial distance from the portion of the valve casing which is subject to elongation on the initial opening of the valve and separated from such portion of the valve casing by an air space of substantial width.

The rods are also made of sufficient length to enable them to support the cross member in a position or zone remote from the valve casing and in a relatively cool zone, so that the cross member and the valve-operating mechanism carried thereby are removed from the parts of the valve casing subject to movement by the heat from the highly heated medium flowing through the valve on the initial opening thereof, with the result that a highly efficient, reliable and durable valve mechanism for controlling the flow of highly heated fluids is provided, and one which operates on subsequent openings of the valve the same as on the initial opening.

These and other features of the invention will be pointed out in the claims at the end of this specification.

Figure 2:
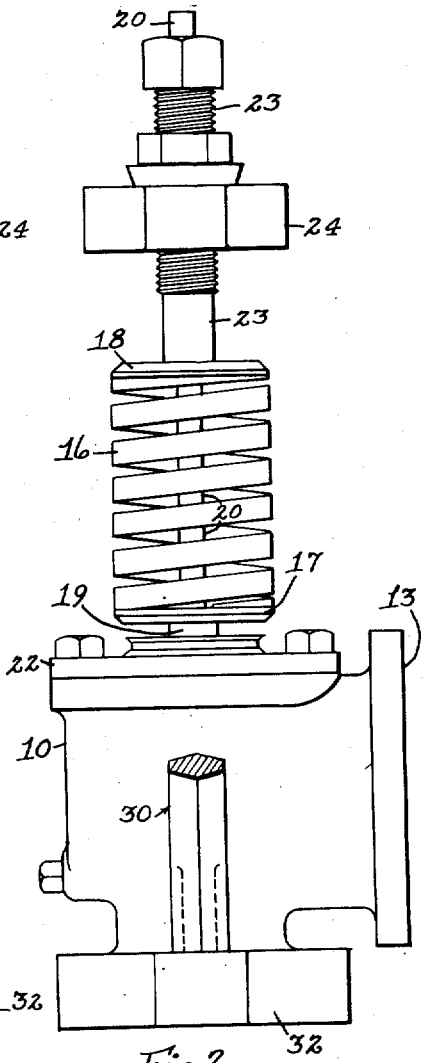

Fig. 1 is a vertical central section of one form of valve mechanism embodying this invention, and Fig. 2, a side elevation of the valve mechanism shown in Fig. 1, looking toward the left, with one of the supporting rods broken away.

In the present instance, the invention is represented as embodied in a valve mechanism of the pop type, in which the valve proper is seated by an operating mechanism including a spring and a rod for adjusting the spring.

In the valve mechanism herein shown, 10 represents the valve casing, which is provided with an inlet port 12 and an outlet port 13.

The flow of the highly heated medium, such as superheated steam, hot oil or the like, through the valve casing 10 is controlled by a valve 14, cooperating with a valve seat 15.

The valve 14 is normally held to its seat by a spring 16, which is located between washers 17, 18, the washer 17 bearing against one end of an enlarged portion 19 of a rod 20.

The enlarged portion 19 at its other end is engaged with the valve proper 14, which is shown as a piston valve movable in a cylinder 21 forming part of a cap 22 for the valve casing. The washer 18 is moved to compress the spring 16 by an operating mechanism, which in the present instance consists of an elongated sleeve or hollow rod 23 through which the valve rod 20 is free to move longitudinally thereof.

The hollow rod 23 is extended through a supporting member, herein shown as a cross bar 24 and is in threaded engagement with said cross bar, so that by turning the hollow rod 23, the spring 16 may be adjusted to hold the valve seated.

The present invention has for its main object to prevent or at least reduce to a minimum injurious action upon the valve and its operating mechanism, of relatively high heats in the highly heated fluid medium flowing through the valve casing 10, such as superheated steam, hot oils or other fluids, whose temperature may be as high as 1000° F. or higher.

To this end provision is made for locating the operating rod 23 at a substantially remote distance from the valve casing 10 and in a relatively cool zone or position, in which the operating rod 23 is not detrimentally influenced by the high temperature of the fluid flowing through the valve casing.

This result is accomplished in the present instance by means of rods 30, 31, preferably of Invar metal, which are connected with the cross member or bar 24 at one end and have their opposite ends connected with arms 32, 33 extended laterally from a portion of the valve casing which is not elongated or moved on the initial opening of the valve 14, said arms being made of sufficient length to enable the rods 30, 31 to be separated from the hotter parts of the valve casing 10 by air spaces 34, 35 of substantial width.

It is preferred to extend the arms 32, 33 from the inlet end of the valve casing of the illustrated construction of valve shown in Fig. 1, as this part of the valve casing is not materially affected by the hot fluids flowing through the valve at the initial opening of the latter, and therefore may be considered as cooler than the upper part of the valve casing, which upper part is not only normally cut off by the valve 14 from the highly heated fluid in the inlet port 12, but is free to move and be elongated by the hot fluid contacting with said upper part when the valve 14 is initially opened. This elongation or movement of the upper part of the valve casing has no injurious or disturbing effect on the valve operating rod 23, the spring 16, the valve rod 20, 19, or the valve 14, consequently these parts maintain the same relation they have when the valve 14 is initially seated and the spring 16 is adjusted by the hollow rod 23 to enable the valve 14 to be opened or popped by a predetermined pressure of the hot fluid on the inlet side of the valve casing.

The rods 30, 31 are made relatively long, so that the cross member may be located in a zone remote from the top of the valve casing, and so that any heat which may be transmitted to the lower ends of the rods 30, 31 will be reduced to such extent that it will be dissipated in the air before it reaches the cross bar 24 or it will at least be reduced to such extent as not convey to the cross bar sufficient heat to detrimentally affect the operating rod 23.

It will be observed that any heat which may be conveyed to the cross bar 24 will be further reduced in temperature as it travels down the operating rod 23 toward the upper part of the spring 16 and toward the valve.

The enlarged portion 19 of the valve stem or rod 20 extends above the valve, so that the lower washer 17 or seat for the spring, is located above the upper surface of the valve casing 10 a substantial distance, and is separated from the part of the valve casing movable on the initial opening of the valve by an air space 36 of substantial width through which air may circulate and carry off heat from the lower part of the spring 16.

Provision is also made for reducing to a minimum heating of the spring 16 by superheated steam or like fluid which may leak by the valve.

To this end provision is made for directing any hot fluid which may leak by the valve to the atmosphere outside or beyond the outer edge of the spring 16 at its lower end. This may be effected by providing the valve 14 with a flange 38 which is beveled on its underside, or the valve may be otherwise constructed to reduce to a minimum the opportunity of the fluid which may leak by the valve, coming in direct contact with the lower washer 17 or seat for the spring 16 and thereby transferring its heat to said seat and spring in sufficient amount to injure the spring.

Valves of the pop type as heretofore constructed and known to me, have been rendered inefficient and inaccurate in operation because of the transfer of heat on the initial pop or opening of the valve, to the operating mechanism of the valve, and particularly to the adjusting device for the spring which is carried by the bonnet or other support for said device, which bonnet is attached to or connected with that part of the valve casing which is elongated by the hot fluid on the initial pop or opening of the valve. The bonnet being thus movable with the part of the valve casing elongates and weakens the spring, and reduces the pressure of the hot fluid required on the inlet side of the valve casing to pop the valve on the second and subsequent pops, thereby rendering the valve of this type unreliable in operation and inaccurate when the spring is adjusted to have the valve initially adjusted to a given condition.

In the present instance, the invention is illustrated as embodied in a valve of the pop type, but it is not desired to limit the invention in this respect, as it may be embodied in other types of valve, such for instance as globe or gate valves, wherein the valve is provided with a stem or rod for moving the valve toward and from its seat. When embodied in this latter class of valves, the valve rod has the same relation to the cross member or bar 24 as the hollow rod 23 of the valve herein shown, and the supporting means herein shown and comprising the cross bar 24, the rods 30, 31, and the arms 32, 33 will function to keep the valve rod cool and thereby avoid the injurious effects of high heats transferred to the valve rod and its valve.

One embodiment of the invention is herein shown, but it is not desired to limit the invention to the particular embodiment shown.

What is claimed is:

1. A valve mechanism suitable for high temperature operation having in combination a valve casing provided with a fluid inlet port, a fluid outlet port, a valve seat between said ports, and arms extended laterally from said valve casing near said fluid inlet port, a valve co-operating with said valve seat, a rod co-operating wtih said valve, a cross member located beyond said valve casing for supporting said rod, supporting rods for said cross member connected with said laterally extended arms, said valve and valve seat being enclosed within said valve casing to prevent heated fluid from striking the supporting rods when the valve is open, said supporting rods being spaced laterally a substantial distance from the valve casing and of such length as to diminish the transfer of heat from the relatively hot part of the valve casing to said cross member and thereby maintain relatively cool said cross member and the valve rod supported thereby.

2. A relief valve suitable for high temperature operation comprising a valve body having a projecting flange at the inlet end, a valve stem extending outwardly from within the body at the exhaust end, a loading spring surrounding the stem beyond the body and connected with the stem at the end portion adjacent the body to oppose outward movement of the stem, a support for the end of the spring remote from the body, and distance rods located entirely without and spaced away from the valve body and connected at opposite ends to the projecting flange and spring support respectively and providing a rigid external support for the fixed end of the loading spring uninfluenced by expansion of the valve body and connected parts.

3. A relief valve suitable for high temperature operation comprising a valve body having a projection at the inlet end, a valve stem extending outwardly from within the body at the exhaust end, a loading spring surrounding the stem beyond the body and connected with the stem at the end portion adjacent the body to oppose outward movement of the stem, a spring-supporting yoke, and adjustable connection between the yoke and end of the spring to provide a normally fixed but adjustable support for the spring, and distance rods located entirely without and spaced away from the valve body and spring and connected at opposite ends to the projection and ends of the supporting yoke, respectively, and providing a rigid external support for the fixed end of the loading spring uninfluenced by expansion of the valve body and connected parts.

4. In a valve mechanism suitable for high temperature operation consisting of a valve casing provided with an exhaust port, a portion of said valve casing being susceptible to being elongated by the initial flow of hot fluid through said casing, a valve enclosed within said casing and controlling the flow of said hot fluid through said casing, and operating means for said valve, in combination with the foregoing elements two spaced parallel rods and a cross member connecting said rods, said rods being positioned one on each side of said exhaust port and being secured to a portion of said casing other than the portion susceptible to being elongated by the initial flow of hot fluid through said casing, there being a substantial air space between each of said rods and said casing, said operating means being entirely located between said rods and being supported by means of said cross member.

5. In a valve mechanism suitable for high temperature operation consisting of a valve casing provided with a portion susceptible to being elongated by the initial flow of hot fluid through said casing, a valve enclosed within said casing and controlling the flow of said hot fluid through said casing, and operating means for said valve, said operating means consisting of a rod directly engaging said valve and resilient means surrounding said rod and normally pressing said rod against said valve, in combination with the foregoing elements, a support for said resilient means connected with a portion of said valve casing other than the portion of said casing susceptible to being elongated by the initial flow of hot fluid through said casing, said support being protected by said casing from the hot fluid flowing through said casing.

6. In a valve mechanism suitable for high temperature operation consisting of a valve casing susceptible to being elongated by the initial flow of hot fluid therethrough, a valve enclosed within said casing and controlling the flow of said hot fluid through said casing, and operating means for said valve, in combination with the foregoing elements, two diametrically opposite lateral extensions provided on the base of said valve casing below said valve, a cross member above said valve substantially parallel to said lateral extensions, a rod on each side of said casing, each of said rods being connected to one of said lateral extensions and said cross member, there being a substantial air space between each of said rods and said casing, said operating means being located entirely between said rods and being supported by means of said cross member.

PERRY H. GENTZEL.